United States Patent
Bertram et al.

(10) Patent No.: US 8,904,556 B1
(45) Date of Patent: Dec. 2, 2014

(54) MULTI-LEVEL SECURITY DISPLAY WITH SECURE INPUT/OUTPUT

(75) Inventors: Joshua R. Bertram, Cedar Rapids, IA (US); James A. Marek, Anamosa, IA (US); Andre F. Mitchell, Cedar Rapids, IA (US); Curtis M. Topf, Cedar Rapids, IA (US); Reginald D. Bean, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 266 days.

(21) Appl. No.: 13/597,426

(22) Filed: Aug. 29, 2012

(51) Int. Cl.
*G06F 7/04* (2006.01)
*H04N 7/167* (2011.01)
*G06F 3/01* (2006.01)

(52) U.S. Cl.
CPC ........................................ *G06F 3/01* (2013.01)
USPC ............................................ 726/28; 380/200

(58) Field of Classification Search
USPC ................... 380/200; 713/150, 153; 726/2–3, 726/26–30; 345/629, 634, 636
See application file for complete search history.

(56) References Cited

U.S. PATENT DOCUMENTS

| | | | |
|---|---|---|---|
| 7,508,454 B1 * | 3/2009 | Vantalon et al. | 348/571 |
| 8,584,211 B1 * | 11/2013 | Vetter et al. | 726/4 |
| 2002/0099959 A1 * | 7/2002 | Redlich et al. | 713/201 |
| 2002/0101991 A1 * | 8/2002 | Bacon et al. | 380/212 |
| 2002/0124182 A1 * | 9/2002 | Bacso et al. | 713/200 |
| 2005/0097329 A1 * | 5/2005 | Morimoto et al. | 713/176 |
| 2005/0097341 A1 * | 5/2005 | Francis et al. | 713/189 |
| 2007/0110248 A1 * | 5/2007 | Li | 380/278 |
| 2008/0301570 A1 * | 12/2008 | Milstead et al. | 715/763 |
| 2009/0046856 A1 * | 2/2009 | Mitchell | 380/243 |
| 2009/0055934 A1 * | 2/2009 | Jauer | 726/26 |
| 2010/0031342 A1 * | 2/2010 | Vogsland | 726/17 |
| 2011/0066851 A1 * | 3/2011 | Bello et al. | 713/166 |

* cited by examiner

*Primary Examiner* — Darren B Schwartz
(74) *Attorney, Agent, or Firm* — Angel N. Gerdzhikov; Donna P. Suchy; Daniel M. Barbieri

(57) ABSTRACT

A method and system for securely distributing human-machine input/output to multi-level displays in a multi-level security environment is disclosed. The method and system in accordance with the present disclosure provides the ability to take input from common input devices and manages the input to ensure that the input is delivered only to the intended security domain/level and that the input is delivered only to the intended display element within the intended security domain/level. Furthermore, architectures configured for supporting the multi-level security display with secure input/output are also disclosed.

9 Claims, 6 Drawing Sheets

MULTI-LEVEL SECURITY DISPLAY WITH SECURE INPUT/OUTPUT

TECHNICAL FIELD

The present disclosure relates generally to display systems, and more particularly to multi-level security display systems.

BACKGROUND

Modern aircraft utilize a significant number of avionics systems. A graphics server such as ARINC 661 graphics server (may be referred to as AGS) or the like may be utilized to work with one or more user applications (e.g., ARINC 661 clients) to manage a display that is presented to a pilot/user. The visual/display elements that make up the display (e.g., buttons, windows, text labels) may be referred to as widgets. A widget is owned by one-and-only-one user application.

In non-secure aircraft configurations, a graphics server is normally not involved with input processing. In such configurations, input is normally treated as out-of-band data that is passed directly from the input device to the user application. If multiple user applications are involved, often times the out-of-band input data is passed to all applications, and only those applications whose widget has focus will respond to the input.

However, this approach breaks down in a multi-level security (MLS) display environment. MLS requires the system to process information with different sensitivities (security levels), permit access by users with different security clearances and needs-to-know, and prevent users from obtaining access to information for which they lack authorization. Therefore, in a MLS display environment, the input provided by an input device must only be routed to a single security domain, i.e., the security domain of the selected widget.

Therein lies a need for a method and system for securely distributing human-machine input/output to multi-level displays in a MLS environment without the aforementioned shortcomings.

SUMMARY

The present disclosure is directed to a multi-level security display system. The system may include a plurality of input devices and a plurality of displays. Each particular display of the plurality of displays may include at least one display element controlled by a graphics server that corresponds to the particular display. The system also includes an input device manager. The input device manager is configured for receiving user input from the plurality of input devices and securely distributing the user input to an intended display element of an active display. More specifically, upon receiving a user input, the input device manager is configured to: determine whether the user input is a selection input or a message input; change the active display according to the user input when the user input is a selection input; send the user input only to the graphics server that corresponds to the active display; identify an active display element being controlled by the graphics server; change the active display element according to the user input when the user input is a selection input; and send the user input only to an application that owns the active display element.

Another embodiment of the present disclosure is directed to a method for securely distributing user input to a plurality of displays in a multi-level security display system. Each particular display of the plurality of displays may include at least one display element controlled by a graphics server that corresponds to the particular display. The method may include: providing an input device manager for managing all user input to the multi-level security display system; determining whether a received user input is a selection input or a message input; identifying an active display among the plurality of displays; changing the active display according to the user input when the user input is a selection input; sending the user input only to the graphics server that corresponds to the active display; identifying an active display element being controlled by the graphics server; changing the active display element according to the user input when the user input is a selection input; and sending the user input only to an application that owns the active display element.

A further embodiment of the present disclosure is directed to a system. The system includes a first Network Interface Device (NID) and a first data router configured for operating with a first network that has a first level of security. The system also includes a second NID and a second data router configured for operating with a second network that has a second level of security. The system further includes: a first processor configured for processing data for the first network, a second processor configured for processing data for the second network, a Cross Domain Guard (CDG) and a Cryptographic Sub-System (CSS) implemented between the first data router and the second data router, a first graphics server configured for controlling graphics for the first network, and a second graphics server configured for controlling graphics for the second network. In addition, the system includes a Multi-Level Security (MLS) merge plane configured for receiving graphics control information from the first and second graphics servers and merging the graphics control information onto a virtual coordinate space for display, and an input device manager configured for receiving user input from a plurality of input devices and securely distributing user input to an intended graphics server, said intended graphics server being one of the first and second graphics servers.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

The present disclosure provides a method and system for securely distributing human-machine input/output to multi-level displays in a MLS environment. The method and system in accordance with the present disclosure provides the ability to take input from common input devices and manages the input to ensure that the input is delivered only to the intended security domain/level (e.g., Top Secret, Unclassified or the like) and that the input is delivered only to the intended widget (especially important when widgets on the same physical display are of different security domains).

It is contemplated that the method and system in accordance with the present disclosure may also be utilized to determine which display, among a set of multi-level or single level displays, is the active display based on previous interaction with the displays. A visual indicator may be provided to the pilot/user to indicate the active display. In addition, the method and system in accordance with the present disclosure may be utilized to manage the input to the set of displays to ensure that the input is delivered only the intended display.

Figure 1:
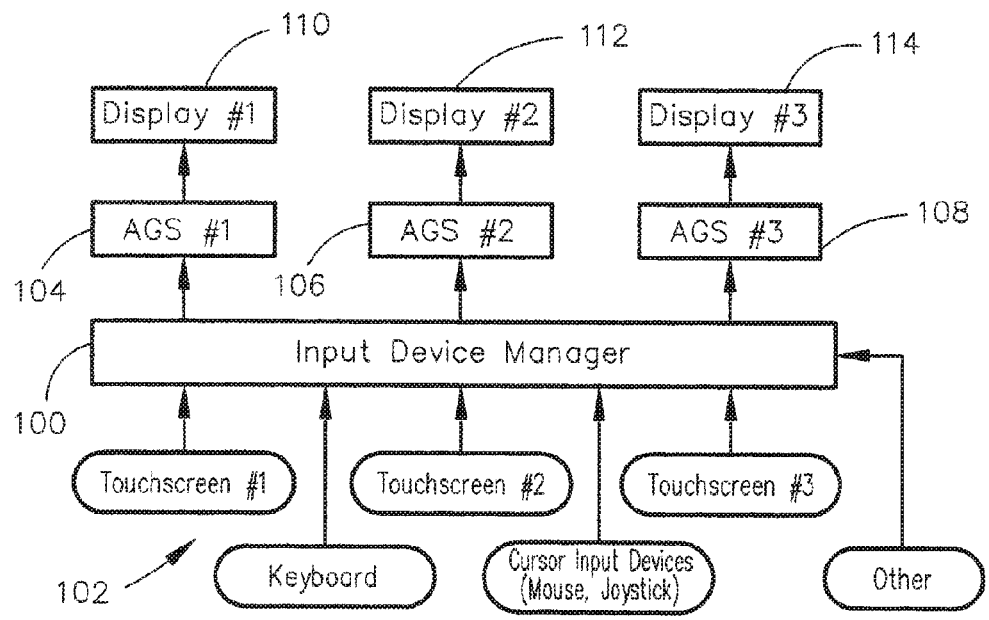
FIG. 1 is a block diagram illustrating an input device manager for securely distributing input data to multiple displays.

Referring to FIG. 1, a block diagram depicting an input device manager 100 for securely distributing input data to multiple displays is shown. The input device manager 100 may receive input data from a plurality of input devices 102 and securely distribute the received input data to intended graphics servers 104, 106 or 108, which in turn control the graphics of their corresponding displays 110, 112 and 114. It is contemplated that due to limited space available on size-constrained platforms such an aircraft, the graphics servers may share a common set of input devices, including, but not limited to, a keyboard, a cursor control device, bezel buttons or the like. It is also contemplated that some of the displays may support touchscreen input. In accordance with the present disclosure, the input device manager 100 is responsible for managing all input to the system.

The primary purpose of the input device manager 100 is to determine which display is active (or intended to be active), and to ensure that the input is only passed to the graphics server associated with the active display. In accordance with the present disclosure, an input may belong to one of two categories: selection input or message input. Selection input is input that may cause the active display to change. Examples of selection input may include touchscreen input, cursor control device Input, as well as certain types of keyboard input (such as special keys) or bezel input that changes the active display. In addition, depending on the capabilities of the human-machine interface of a given avionics system, selection input may include many other types of input such as voice command or the like. While the selection input is used by the input device manager 100 to determine which display is active, the selection input may also be passed through to the active graphics server (the server associated with the display that is determined to be active) so that the graphics server may also process the input, which may for example cause a new widget to be activated (to be described later). Message input, on the other hand, is input that does not cause the active display to change, but instead is passed to the active graphics server directly for further processing.

Figure 2:
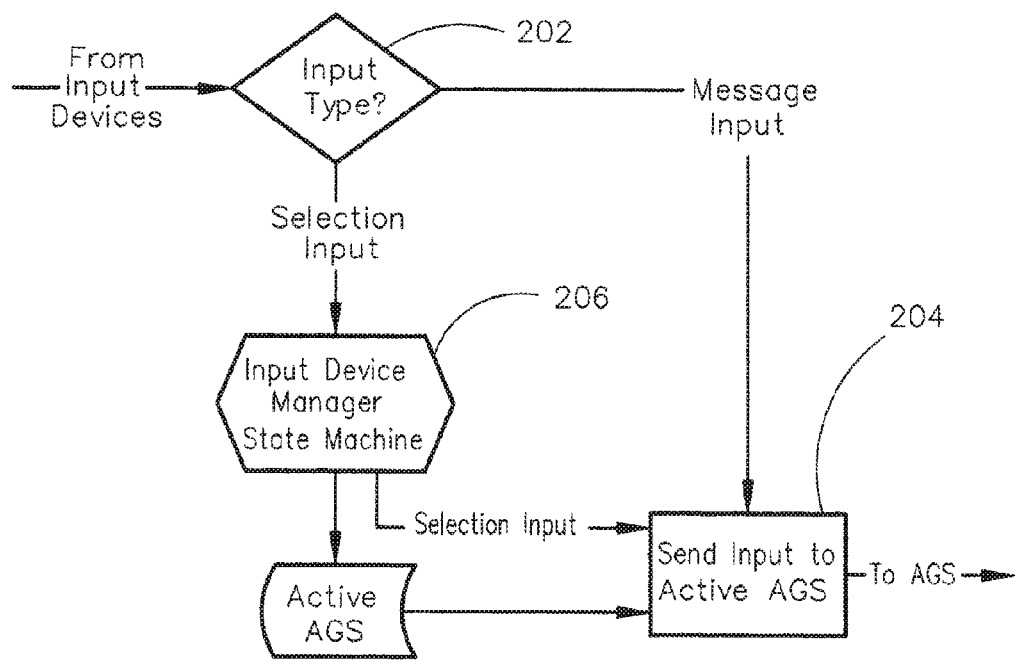
FIG. 2 is a flow diagram illustrating operations of an exemplary input device manager.

FIG. 2 is a flow diagram illustrating the operation of an exemplary input device manager 100 according to one particular implementation. Upon receiving an input from an input device, step 202 may first determine whether the input is a selection input or a message input. If it is a message input, then the input is directly passed to the currently active graphics server as indicated in step 204. Otherwise, if the input is a selection input, the input is feed into a state machine 206. The state machine 206 is utilized to track/change the currently active graphics server based on the selection input. Once the active graphics server is determined, the selection input may then be passed to the currently active graphics server for further processing. In the event that the currently active graphics server is different from the previously active graphics server, the previously active graphics server may be notified about the change (e.g., an "inactive" signal may be sent to the previously active graphics server). Upon receiving such a notification, the previously active graphics server can update its internal state, send any messages that are required, and update any display state as necessary (such as hiding a cursor or changing some part of the screen that indicates it is now "inactive").

It is contemplated that the specific implementation of the state machine 206 is dependent on the particular input devices utilized in the system, and they may vary without departing from the spirit and scope of the present disclosure. However, for illustrative purposes, a simplified state machine for the system of FIG. 1 is shown and described in FIG. 3.

Figure 3:
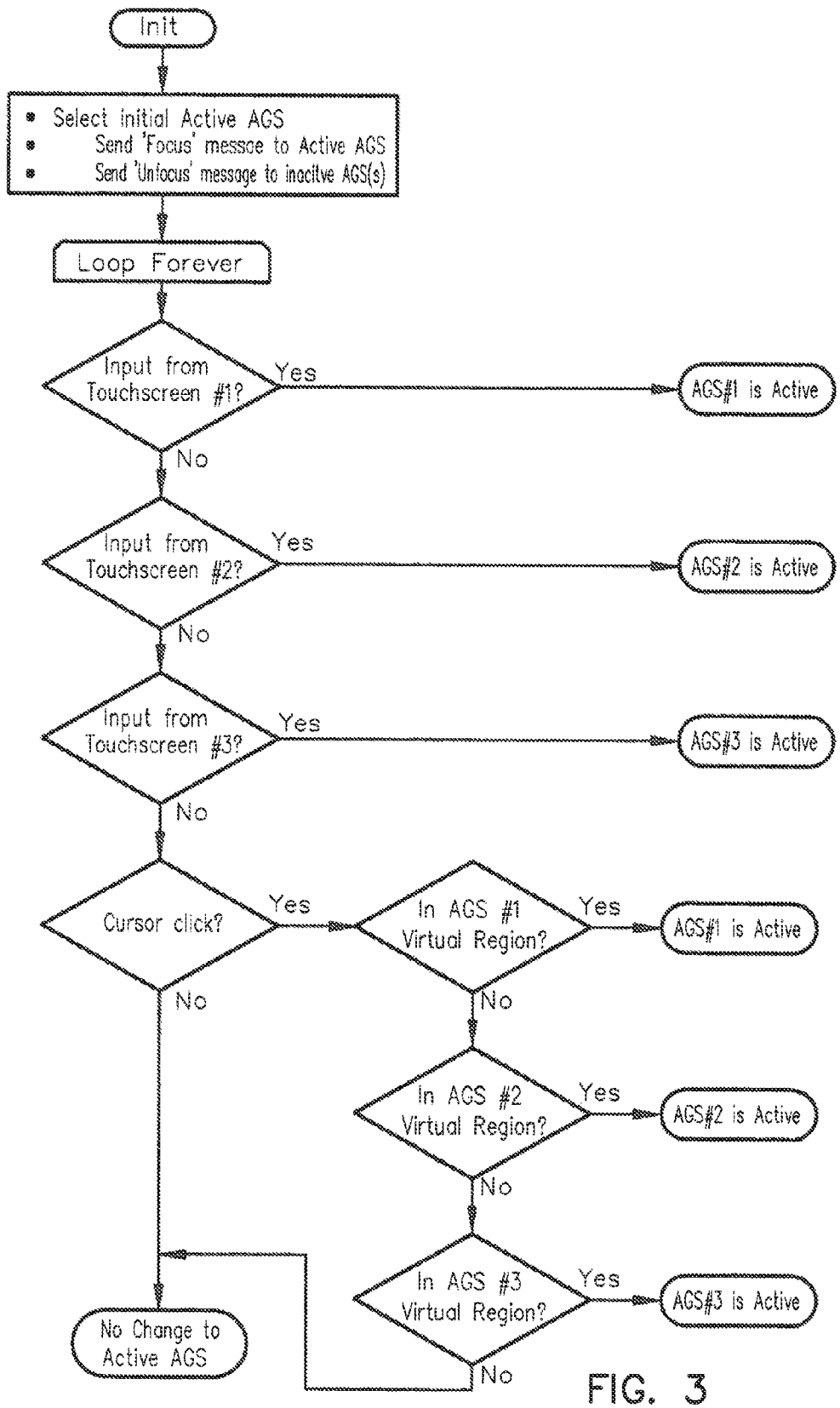
FIG. 3 is an illustration depicting a state machine for tracking/changing the active graphics server.
Figure 4:
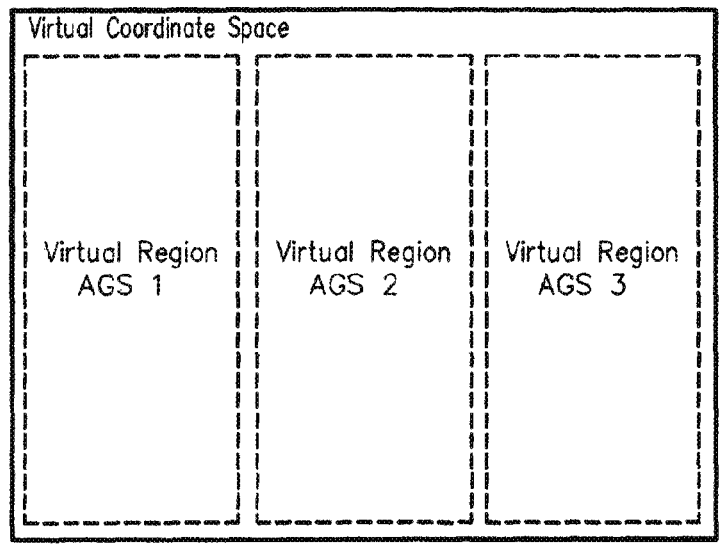
FIG. 4 is an illustration depicting a virtual coordinate space.

Note that the cursor management function depicted in FIG. 3 may utilize the concept of a "virtual coordinate space", where the cursor moves in a space that is the union of all displays. The concept of virtual coordinate space is further illustrated in FIG. 4, where each display may be allocated a specific portion of the overall virtual space. Each portion may be referred to as a "virtual region". The cursor management is able to detect when the cursor moves out of one display's virtual region and into another's virtual region. The state machine may therefore determine which display is the active display accordingly. It is understood that the virtual coordinate space illustrated in FIG. 4 is merely exemplary; the virtual regions may be partitioned differently without departing from the spirit and scope of the present disclosure.

Once the input device manager 100 passes the input to the currently active graphics server, the graphic server receiving the input needs to determine which widget within the display is the active widget and only passes the input to the active widget. For instance, each graphics server may contain a special input port connection from the input device manager 100 where all input is expected. Each graphics server may periodically monitor its input port for input signals. Upon receiving an input, the graphics server is configured to send the input data to the application that owns the focused widget. The application may then consume the input data and make the proper calls to stimulate its focused widget. In accordance with the present disclosure, the graphics server is trusted to ensure that the input data is routed to the correct application through the security domain that the application belongs to. This process may be implemented similar to the input device management process described above.

Figure 5:
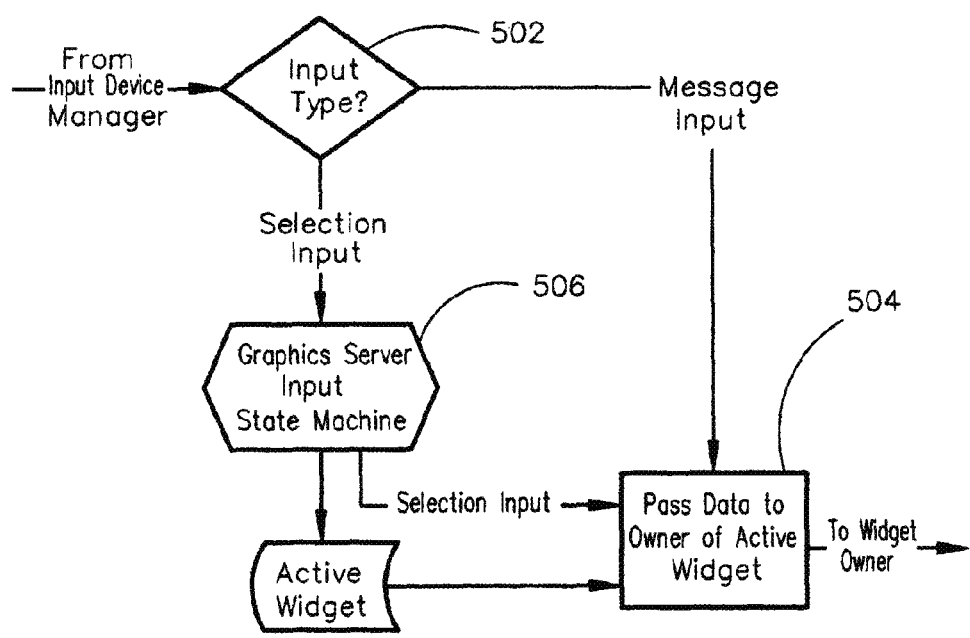
FIG. 5 is an illustration depicting a state machine for tracking/changing the active widget.

FIG. 5 is a flow diagram illustrating operations for sending an input to a widget owner according to one particular implementation. Upon receiving the input from the input device manager, step 502 may first determine whether the input is a selection input or a message input. If it is a message input, then the input is directly passed to the application that owns the currently active widget as indicated in step 504. Otherwise, if the input is a selection input, the input is fed into a state machine 506. The state machine 506 is utilized to track/change the currently active widget based on the selection input. Once the active widget is determined, the selection input may then be passed to the application that owns the currently active widget for further processing.

It is contemplated that the state machine 506 may be implemented similarly as the state machine utilized for tracking the active display. However, the specific implementation of the state machine 506 is dependent on the particular input devices utilized in the system, and they may vary without departing from the spirit and scope of the present disclosure. Furthermore, the state machine based implementations are not required in order to track/change the currently active graphics server and the currently active widget. Various other processes may also be utilized for the same purpose without departing from the spirit and scope of the present disclosure.

Figure 6:
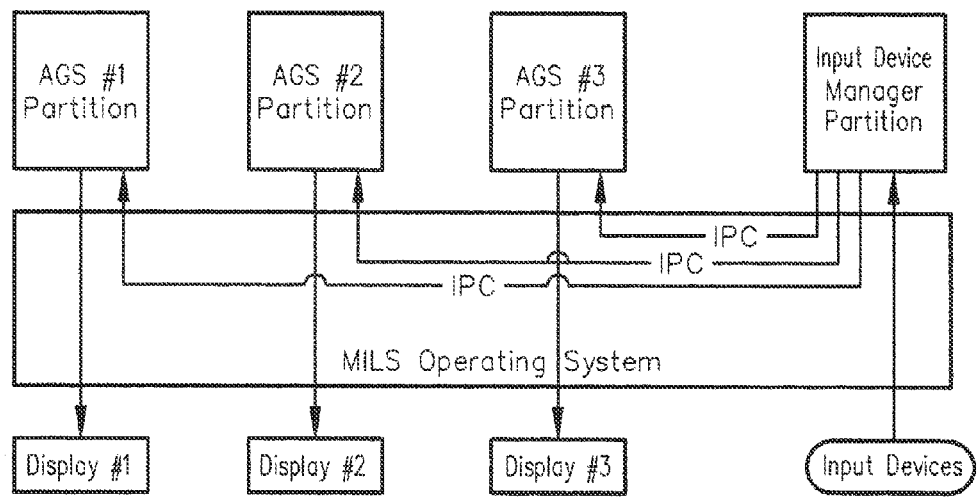
FIG. 6 is a block diagram illustrating an implementation wherein multiple graphics servers share a single hardware platform within a MILS Operating System.

It is further contemplated that the graphics servers may be implemented as separate components as shown in FIG. 1. Alternatively, the graphics servers may be implemented as a part of an integrated system. FIG. 6 depicts an implementation wherein multiple graphics servers share a single hardware platform within a MILS (Multiple Independent Levels of Security) Operating System (may also be referred to as separation kernel). In this example, all components may act as normal with the exception that communications between the partitions is performed over whatever IPC (Inter-Partition Communications) mechanism is supported by the particular operating system. Each graphics server partition may utilize a portion of the processor's time, but each graphics server partition may utilize separate memory and resources and cannot interfere with any other partitions. It is understood that the graphics servers may process the selection input and/or message input as described above.

Figure 7:
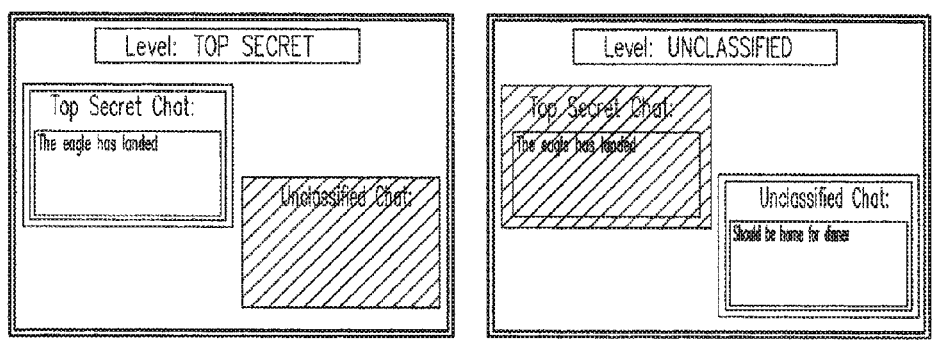
FIG. 7 is an illustration depicting some exemplary visual indicators that may be provided.

Furthermore, in order to aid the pilot/user, visual or some other form of feedback (e.g., audio, vibration or the like) may be utilized to indicate which security level or domain the input devices will be passed to. For example, a reserved area of a display may denote which security level is currently "active". Additionally, the widget that currently has the focus may be highlighted with the same color and all inactive widgets may indicate that they will not receive input (e.g., grayed out). FIG. 7 depicts some exemplary visual indicators that may be utilized. It is contemplated, however, that various other types of indicators may also be utilized without departing from the spirit and scope of the present disclosure.

In addition to normal input types such as cursor, keyboard or touchscreen input, alternative or future input types may also be supported. In the case of voice input, for example, an integrated voice processing system may be utilized to interpret/recognize voice commands and classify the voice commands as either selection input or message input, allowing voice commands to be processed in the manner as described above. In some cases, voice input may always be considered as message input (i.e., it is simply a voice feed). For example, if the currently active widget is Top Secret, then all keyed microphone input from the pilot may be routed to a Top Secret radio/communications interface.

Furthermore, it is contemplated that secure output may be desirable in certain implementations in addition to secure input as described above. This may in turn require such output to be tied to the currently active security domain. For example, perhaps an input to the system is the state of the cockpit door in some aircraft. The cockpit door may segregate the aircraft into a secure compartment and an unsecure compartment, where only cleared individuals may access the secure area. In this case, the door may serve as a "master switch" to allow Top Secret communications to occur. In the event that the door is inadvertently opened or is otherwise compromised, no Top Secret communication is allowed to occur. In terms of output, for example, if the door is opened, all Top Secret information currently displayed may need to be cleared. Additionally, any audio output from the system (e.g., Top Secret voice communications from another station) may also be blocked. It is contemplated that various other techniques for securing output may also be implemented without departing from the spirit and scope of the present disclosure.

It is also contemplated that various types of architectures may be configured to support the multi-level security display with secure input/output in accordance with the present disclosure. For instance, a standalone Cross Domain Guard (CDG), which provides the ability to manually or automatically access or transfer data between two or more differing security domains, may be implemented between differing classification networks. In addition, a standalone Cryptographic Sub-System (CSS), which provides all cryptographic functionalities needed by the system, may be implemented between a classified network and an untrusted transmission plane. However, in a size, weight and power constrained environment such an aircraft, discrete devices with their own user interfaces do not present an optimal solution. Alternatively, a combined CDG-CSS architecture with an MLS user interface is utilized in one particular embodiment. This architecture allows the pilot/user, through a single user interface, to display and interact with information associated with different levels of security.

Figure 8:
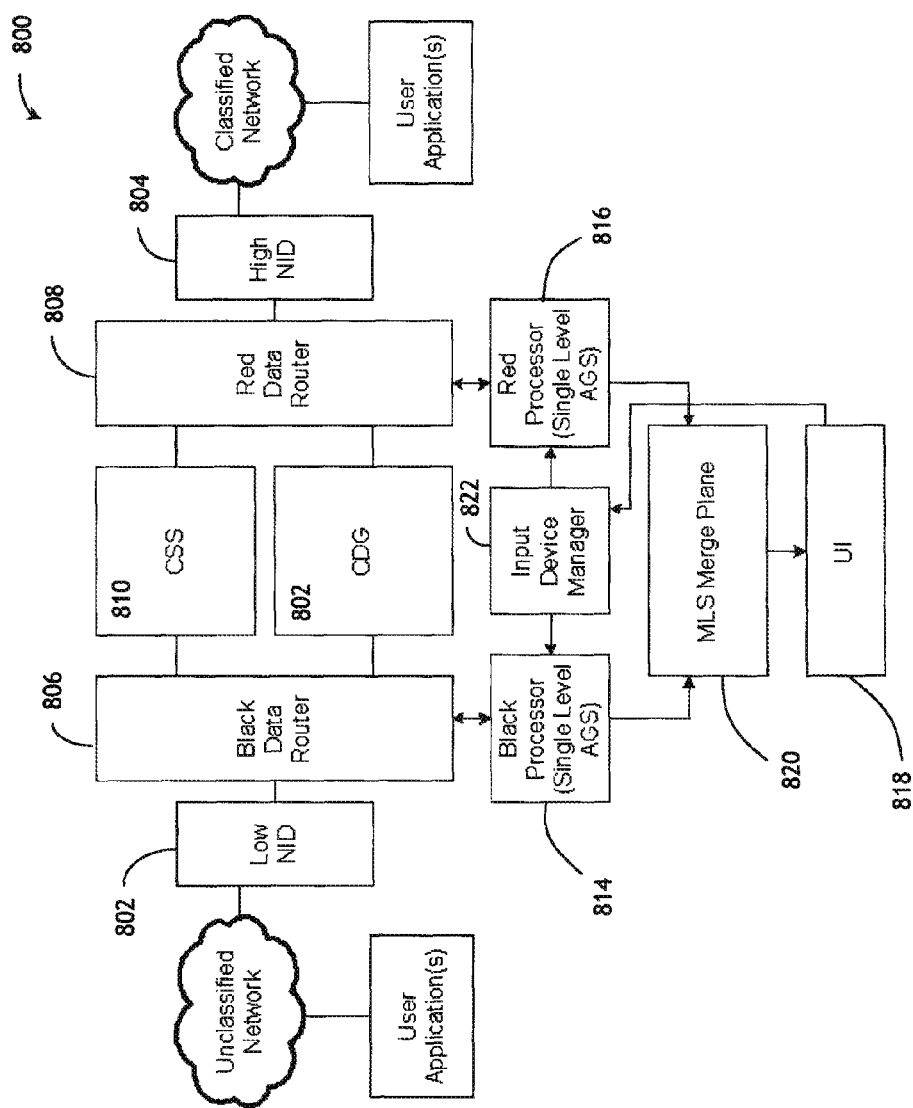
FIG. 8 is a block diagram depicting a combined CDG-CSS architecture supporting an MLS user interface.

FIG. 8 is a block diagram depicting the architecture for system 800 where the Low Network Interface Device (NID) 802 and High NID 804 interface with unclassified and classified networks, respectively. In this architecture, the NIDs transmit and receive data from their respective networks. Each network may support one or more user applications. The data is passed onto the data routers, referred to as the "black" data router 806 for low security data and "red" data router 808 for high security data. The data routers determine which channel the data is to flow through and present data to the CSS 810, CDG 812 or to a processor ("black" processor 814 or "red" processor 816) for processing depending on message type or address. Additionally, the "red" data router 808 may provide control interface for the "red" processor 816 to control the CSS 810 and/or CDG 812.

It is contemplated that the references to low security data (i.e., "black" data) and high security data (i.e., "red" data) are merely exemplary. The security levels supported by the combined CDG-CSS architecture in accordance with the present disclosure may not be limited to two. For instance, additional NIDs may be utilized to interface with additional networks, some of which may have different security levels than to the networks interfacing with Low NID 802 and High NID 804. Each NID in the architecture may be in communication with a corresponding data router, which may determine the channel the data is to flow through and present data to the CSS 810, CDG 812 or to a corresponding processor for processing depending on message type or address.

In accordance with the present disclosure, user control of the system is accomplished through a user interface (UI) 818. In one embodiment, the UI 818 receives display information from the various user applications through a MLS merge plane 820. The MLS merge plane 820 takes display information from both the red and black processors, merges the information onto a virtual coordinate space (as described above), and still maintains the separation between the black processor 814 and red processor 816. The UI 818 also sends all user input to the input device manager 822. As described above, for each input received, the input device manager 822 determines which display is active (or intended to be active) and ensures that the input is only passed to the graphics server associated with the active display. For instance, if the active display belongs to a user application of the unclassified network, the input device manager 822 should only provide the input signals to the graphics server associated with the black processor 814 for further processing. On the other hand, if the active display belongs to a user application of the classified network, the input device manager 822 should only provide the input signals to the graphics server associated with the red processor 816 for further processing.

Utilizing the MLS merge plane 820 and the input device manager 822, the combined CDG-CSS architecture in accordance with the present disclosure may also be configured to support "drag and drop" features. For instance, the virtual coordinate space allows the user to "drag and drop" information from the red side to the black side (or vice versa). The CDG 812 and the input device manager 822 may be utilized to rule check the data and the merge plane coordinate data may be attached to the "drag and drop" information via the input device manager 822. Additionally, the combined CDG-CSS architecture in accordance with the present disclosure may also allow the user to control the system through the user interface. For instance, a visual representation of the network may be displayed on the UI. Through simple "point and click" processing accomplished through the virtual coordinate space, CDG and CSS channel instantiation may be accomplished through a graphical interface.

Figure 9:
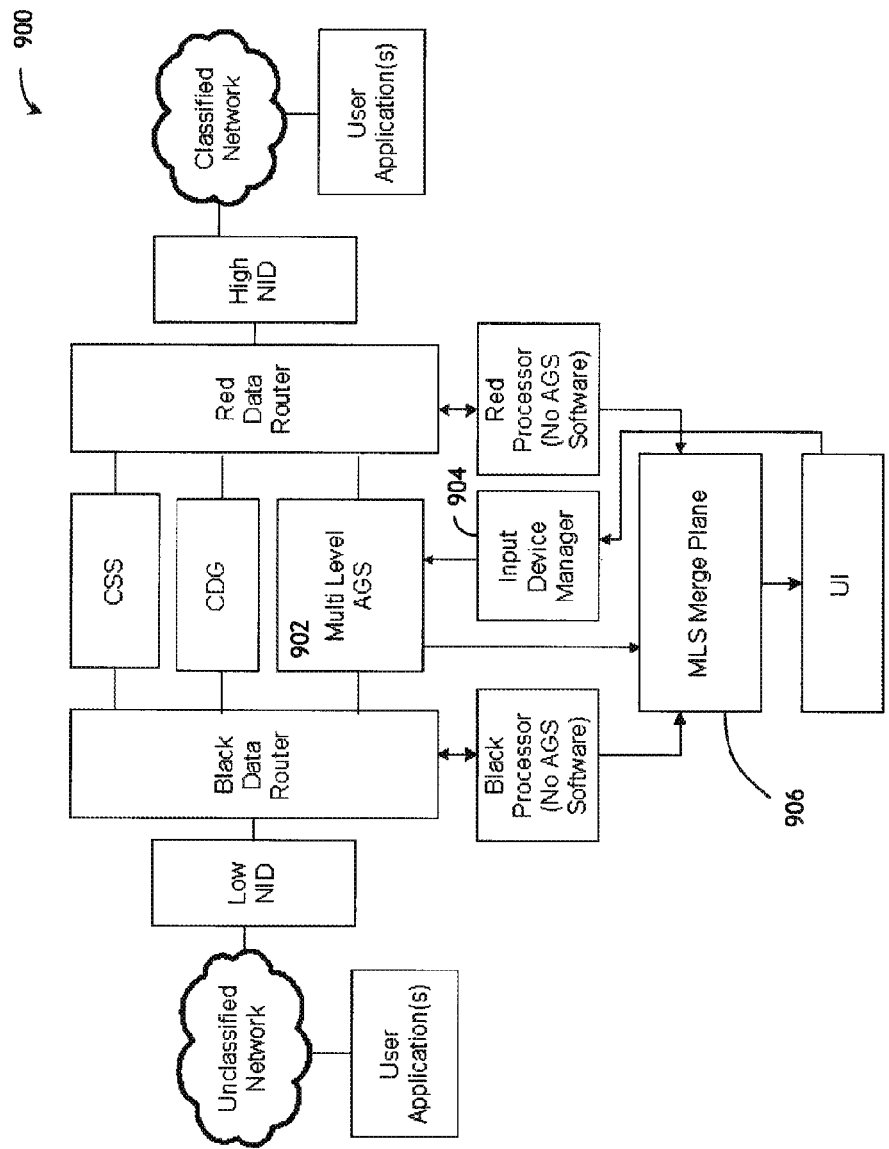
FIG. 9 is a block diagram depicting an alternative CDG-CSS architecture also supporting an MLS user interface.

It is contemplated that the red and black processors are not required to be associated with the single level graphics servers (i.e., specific to each security level) as shown in FIG. 8. Alternatively, a multi level graphics server may be utilized to control the graphics. FIG. 9 depicts an architecture 900 similar to that depicted in FIG. 8, but utilizes the multi level graphics server 902 instead of the graphics servers associated with the processors. The multi level graphics server 902 may be implemented in a manner similar to that described in FIG. 6. Such a configuration allows the input device manager 904 to communication directly with the multi level graphics server 902 and reduces the need for the input device manager 904 to establish communication separately with each processor in the system (as shown in FIG. 8). Furthermore, this configuration also allows the MLS merge plane 906 to receive graphic control information directly from the multi level graphics server 902. It is therefore contemplated that the multi level graphics server implementation may be appreciated in various applications, especially in systems having a large number of different security levels.

It is also contemplated that the method and system in accordance with the present disclosure may be appreciated in other types of vehicles in addition to aircraft. The vehicle may be any mechanical means of conveyance or transport, which may include, but is not limited to, airborne vehicles, maritime vehicles, land-based vehicles or the like. Furthermore, the method and system in accordance with the present disclosure may be appreciated in other environment that may require data entry into multiple security domains, such as terminals in command and control centers, intelligence analysis, or even wearable computers in the field.

It is further contemplated that the method and system in accordance with the present disclosure may be expanded to cover safety as well as security without departing from the spirit and scope of the present disclosure. That is, the method and system in accordance with the present disclosure may also be configured to provide the ability to take input from common input devices and manages the input to ensure that the input is delivered only to the intended safety domain/level and only to the intended widget within the intended safety domain/level.

It is understood that the graphics servers depicted in the descriptions and figures above are not limited to ARINC 661 graphics servers (AGS). The method and system for securely distributing human-machine input/output to multi-level displays in accordance with the present disclosure may be implemented using any type of graphics servers and technologies without departing from the spirit and scope of the present disclosure. Furthermore, it is also understood that the term "widget" is used to generally refer to any display/graphical element on a display (e.g., buttons, windows, text labels or the like). The term "widget" used in the present disclosure is not associated with any particular display standard or specification, and the method and system for securely distributing human-machine input/output to multi-level displays in accordance with the present disclosure is applicable to various display standards or specifications without departing from the spirit and scope of the present disclosure.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A system, comprising: a first Network Interface Device (NID) and a first data router configured for operating with a first network, the first network having a first level of security;
   a first processor configured for processing data for the first network;
   a second NID and a second data router configured for operating with a second network, the second network having a second level of security;
   a second processor configured for processing data for the second network;

a Cross Domain Guard (CDG) and a Cryptographic Sub-System (CSS) implemented between the first data router and the second data router;

a first graphics server configured for controlling graphics for the first network;

a second graphics server configured for controlling graphics for the second network;

a Multi-Level Security (MLS) merge plane configured for receiving graphics control information from the first and second graphics servers and merging the graphics control information onto a virtual coordinate space for display; and an input device manager configured for receiving user input from a plurality of input devices and securely distributing user input to an intended graphics server, said intended graphics server being one of the first and second graphics servers, wherein the input device manager is further configured for: determining whether an user input is a selection input or a message input; identifying an active display according to the user input when the user input is a selection input; sending the user input only to the identified graphics server that corresponds to the active display; identifying an active display element being controlled by the identified graphics server; and sending the user input only to an application that owns the active display element.

2. The system of claim 1, wherein the first graphics server is a single level graphics server implemented as an integrated component of the first processor and the second graphics server is a single level graphics server implemented as an integrated component of the second processor.

3. The system of claim 1, wherein the first and second graphics servers are implemented utilizing a MLS graphics server, the MLS graphics server being a separate component from the first and second processors.

4. The system of claim 1, wherein a state machine is utilized for tracking and changing the active display among a plurality of displays.

5. The system of claim 1, wherein a state machine is utilized for tracking and changing the active display element.

6. The system of claim 1, wherein the input device manager is further configured for: providing a visual indicator configured for indicating at least one of: the active display and the active display element.

7. The system of claim 1, wherein the CDG and the input device manager are configured for facilitating data transmission between the first data router and the second data router.

8. The system of claim 1, wherein the CSS is configured for providing all cryptographic functionalities needed by the first data router and the second data router.

9. The system of claim 1, further comprising:

at least one additional NID and at least one additional data router configured for operating with at least one additional network having a level of security different than the first level of security and the second level of security;

at least one additional processor configured for processing data for the at least one additional network;

at least one additional graphics server configured for controlling graphics for the at least one additional network;

wherein the MLS merge plane is configured for receiving graphics control information from the first, the second and the at least one additional graphics servers and merging the graphics control information onto the virtual coordinate space for display; and wherein the input device manager is configured for receiving user input from the plurality of input devices and securely distributing user input to the intended graphics server, said intended graphics server being one of the first, the second and the at least one additional graphics servers.

* * * * *